Aug. 4, 1931.          H. D. GEYER          1,817,436
RUBBER SHACKLE

Filed Nov. 3, 1926

Inventor
Harvey D. Geyer
By Spencer Hardman & Fehr
Attorney

Patented Aug. 4, 1931

1,817,436

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

RUBBER SHACKLE

Application filed November 3, 1926. Serial No. 146,045.

This invention relates to flexible rubber and fabric connectors adapted for use as substitutes for spring shackles, torque arm connections and the like.

Its object is to provide a simple and efficient form of rubber and fabric connection which can be produced at low cost.

Further objects and advantages of the present invention will be apparent from the following description, reference being had to the accompanying drawings, wherein a preferred form of embodiment of the present invention is clearly shown.

In the drawings.

Similar reference characters refer to similar parts in the several views.

Figure 1:
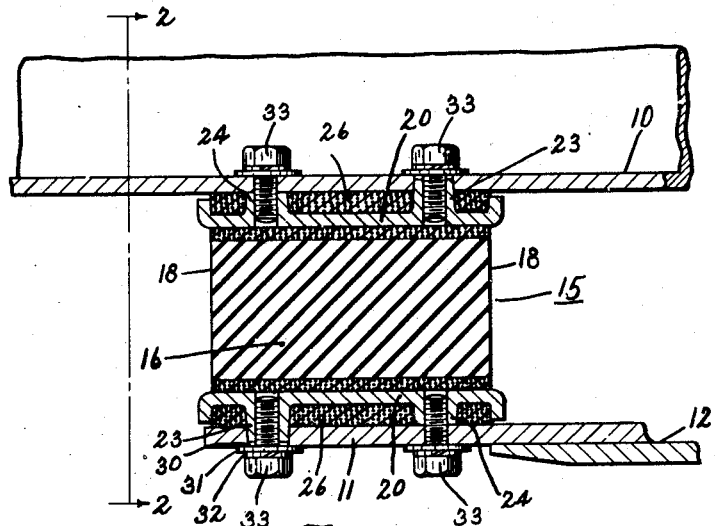
Fig. 1 is a vertical section on line 1—1 of Fig. 2 and illustrates a shackle built according to this invention connecting the rear end of the semi-elliptic front spring of an automobile chassis to the side rail of the chassis frame.

Numeral 10 designates the side rail of the chassis frame and 11 the projecting end of the long leaf of the leaf spring 12. The molded rubber and fabric unit which is fixed to parts 10 and 11 is indicated in its entirety by numeral 15. This molded unit 15 comprises an elastic rubber block 16 of greater length than width and having bulging lateral sides and substantially flat top and bottom surfaces. Rubberized cord fabric is wrapped laterally around block 16 to form an endless flexible fabric casing 17 therefor but leaving the ends 18 of the rubber block 16 unconfined. The substantially non-extensible cords of the fabric casing 17 extend peripherally around block 16 in the direction in which the fabric is wrapped therearound. The molded in metal inserts 20 are put in position after the several inner layers 21 of the cord fabric have been wrapped on, and then the outer layers 22 of cord fabric are wrapped on extending around the outside of the inserts 20, as clearly illustrated in the drawings. The inserts 20 have outwardly projecting slightly tapered bosses 23 and 24, the bosses 23 projecting beyond the outer surface of the cord fabric casing 17 while the tip of bosses 24 lies substantially flush with said outer surface when in final position (see Fig. 1). This unit 15, made as above described, is vulcanized in a suitable mold to the desired degree of hardness and flexibility. The elastic rubber block 16 when removed from the mold should be of sufficient hardness to withstand the compression load imposed thereupon without excessive bulging out at the unconfined ends thereof, while the rubberized cord fabric casing 17 should be very flexible at the bulging lateral sides 25 and may be cured quite hard and non-flexible at the portions 26 which are clamped between the metal inserts 20 and the parts 10 and 11.

Now this molded unit 15 may be readily secured to part 11 by extending the tapered end of boss 23 into the correspondingly tapered hole 30 in the spring leaf 11, and then applying the washers 31, lock washers 32 and cap screws 33. The cap screws 33 draw the metal clamping insert 20 down very tightly, thus clamping portion 26 of the cord fabric casing firmly in place. The top part of the molded unit 15 is similarly fixed to the horizontal flange of the side rail 10.

In operation, the compressive load taken by the elastic rubber block 16 which is due to the weight of the automobile body causes the rubber block to bulge out laterally against the portions 25 of the fabric casing 17, thus putting these portions under tension. However since these portions 25 are substantially non-extensible under such tension the lateral bulging of the block 16 will be limited thereby. The block 16 is free to bulge out at its unconfined ends; however the vertical area of these ends is small compared to the horizontal sectional area of the elastic rubber block and since the elastic rubber is firmly bonded to the fabric casing this end bulging will not be excessive if the rubber block is cured to the proper degree of hardness.

Figure 2:
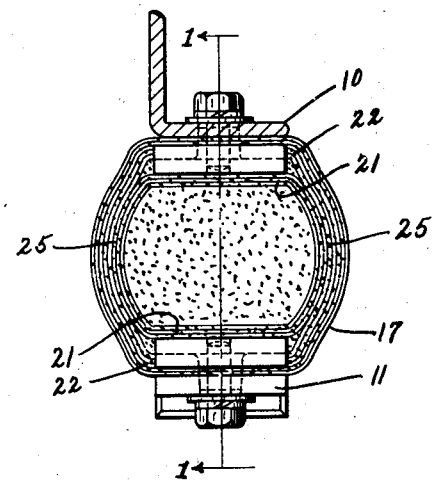
Fig. 2 is an end view of the shackle taken on line 2—2 of Fig. 1.

The desired to and fro movement of the end 11 of the semi-elliptic spring 12 is permitted by a peculiar distortion of the rubber block 16 and the laterally bulging portions 25 of the fabric casing 17 without any excessive stress on the fabric casing. This peculiar distortion is not easily described. If the lateral walls 25 of the fabric casing were in vertical planes, rather than bulging out as clearly shown in Fig. 2, such to and fro movement of the spring end 11 could not be had without very great shearing stresses on the fabric casing. The outward bulging of the lateral walls 25 permits the fabric casing to follow this to and fro movement of spring end 11 without excessive shearing stress thereupon by giving the elastic rubber block 16 a sort of skewed distortion as the spring end 11 moves in either direction from its normal centered position.

While the form of embodiment of the present invention as herein disclosed, constitutes a preferred form, it is to be understood that other forms might be adopted, all coming within the scope of the claims which follow.

What is claimed is as follows:

1. In combination with a leaf spring and frame of a vehicle, a shackle interposed between said spring and frame and comprising: an elastic rubber block extending longitudinally with said spring and having a flexible web of rubberized fabric wrapped about the lateral sides thereof and molded thereto, and means for clamping the lower portion of said flexible web to said spring and other means for clamping the upper portion of said web to said frame.

2. A compression shackle for connecting a leaf spring to a member supported thereby, comprising: an elastic rubber block, a flexible rubberized fabric web molded to the lateral sides of said block leaving the ends of said block unconfined, and means for fixing the lower portion of the rubber and fabric unit to said leaf spring, and other means for fixing the upper portion of said unit to said member.

3. In combination, a compression shackle for flexibly connecting two relatively movable members comprising, an elongated block of elastic rubber having a flexible non-stretchable fabric casing over the bulging lateral walls thereof and having its end walls unconfined, said blocks being secured between said two members connected thereby with its long axis extending in the direction of relative motion between said members.

4. A flexible connector, comprising a molded body of elastic material reinforced by a substantially non-extensible fabric casing molded therein, said connector having two diametrically opposed metal inserts embedded between the laminæ of said fabric casing and each having means for clamping the portion of the fabric casing exterior thereto to one of the parts to be connected by said connector.

5. A flexible connector, comprising a molded body of elastic material reinforced by a substantially non-extensible fabric casing molded therein, said connector having two diametrically opposed metal inserts embedded between the laminæ of said fabric casing and each having a threaded recess therein for the attachment thereto of the parts to be connected by said connector.

In testimony whereof I hereto affix my signature.

HARVEY D. GEYER.